June 8, 1948.　　　　　　J. A. HEANY　　　　　　2,442,976
PROCESS OF COATING GLASS WITH SILICA
Filed Jan. 6, 1942

A VAPORIZABLE
SILICON COMPOUND

FINELY DIVIDED SILICA IN
SOLUTION OR SUSPENSION

INVENTOR
John Allen Heany
BY
Bracelton, Whitcomb & Davies
ATTORNEYS

Patented June 8, 1948

2,442,976

UNITED STATES PATENT OFFICE 2,442,976

PROCESS OF COATING GLASS WITH SILICA

John Allen Heany, New Haven, Conn.

Application January 6, 1942, Serial No. 425,743

2 Claims. (Cl. 117—124)

This invention relates to processes of coating articles with thin, vitreous silica films and to products resulting from said processes.

Among the objects of the present invention is to provide processes for coating articles with pure silica; to provide silica processes in which the heating step is carried out at temperatures below the fusion point of silica; to provide means for removing "glare" from glass surfaces without affecting the transmissibility of the glass for light.

A further object relates to the provision of means for providing a thermal resisting surfacing for glass and metal sheets, instruments and dishes.

Other objects will appear on consideration of the following description of a process of carrying out my invention, in conjunction with the accompanying drawings, in which.

Silica has several important advantages when employed where heat resistance is a factor, due to its extraordinary low coefficient of expansion for heat. In addition, when thin films of transparent silica are placed on glass, glare is removed from the surface. This is of importance in optical instruments, television reflectors, instrument dials, plate glass and other uses. The use of silica for the above purposes, however, has been restricted owing to the difficulty of working silica and forming it into sheets or films.

Figure 1:
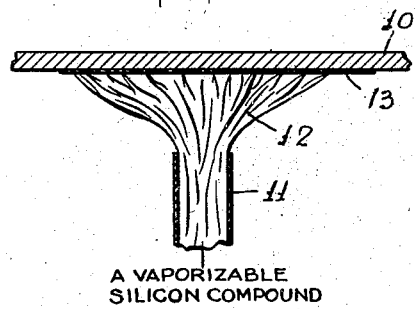
Fig. 1 is a view showing one method of coating a flat plate surface.

In accordance with my method I first obtain silica in small particle form, preferably in colloidal form where the particle size is usually well below 50 microns in diameter, colloidal particles generally having a diameter less than one micron. I obtain this colloidal size particle of silica by the method illustrated in Fig. 1.

I utilize a combustible, vaporizable silicon compound such as silicochloroform ($SiHCl_3$) or silicomethane, silicoethylene, ethyl silicate, silicon alkides, hydrides or halides. This compound is vaporized and passed as a gas 12 through the tube 11, and burned, the products of combustion impinging on the plate 10, which may be of glass, and collecting thereon in the form of a thin layer or film 13.

Figure 2:
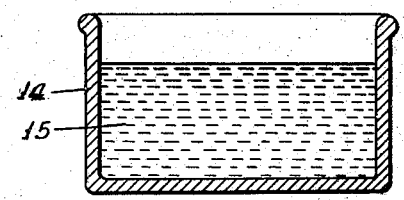
Fig. 2 is illustrative of a modified method of coating a surface.

Alternately I may coat the solid surface by the means indicated in Fig. 2. In this modification of the process the silica in colloidal form is placed in solution or suspension in a liquid 15 in a container 14. The liquid may be water or an inorganic or organic solvent with or without a temporary binder. The object to be coated is dipped in the bath 15 and then dried.

Figure 3:
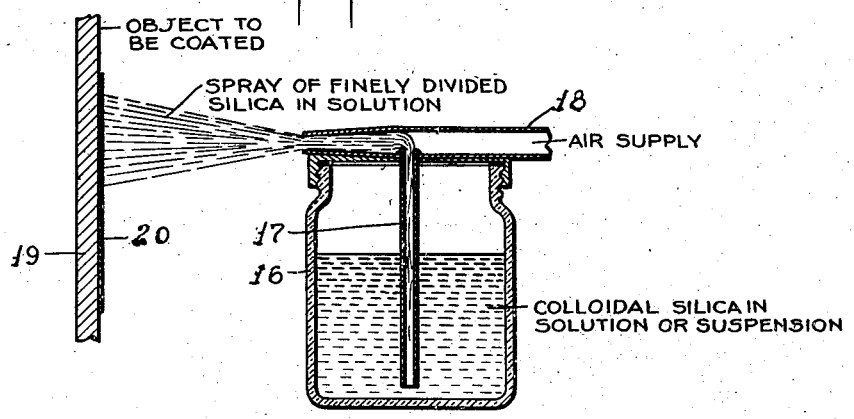
Fig. 3 is illustrative of a third method of coating surfaces.
Figure 4:
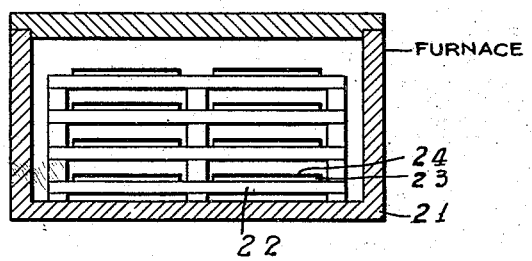
Fig. 4 is a section through a furnace for fixing the silica film.

Still another method of coating a solid surface is to spray the surface with vapor from a solution or suspension containing colloidal silica. As shown in Fig. 3, the silica liquid is placed in the container 16 having a cover top through which a depending outlet tube 17 extends. This tube enters at the outlet of an air supply tube 18 which, being under pressure, picks up the liquid and throws it as a fine spray on the plate 19, thus forming the layer 20.

When coated by any one of the methods hereinabove mentioned the plate, indicated generally as 23, with the coating 24, is dried and then placed in the furnace 21 on shelves or supports 22, where they are heated to a temperature of 1000° to 1500° C. or below the melting point of silica. The temperature of the furnace is raised very slowly so as not to distort the surfaces and produce cracking. For example, in coating porcelain I raise the furnace temperature gradually from room temperature to around 1300° C. and shut off the heat, and permit gradual cooling to room temperature. The heating period in this case is about four hours and the cooling period five hours. After the heat treatment the layer becomes vitreous and permanently adherent to the supporting surface, forming a dense, homogeneous, non-porous film.

Obviously, in the various methods of coating, the thickness of the coating may be varied at will, either by lengthening the time of treatment or by subjecting the surface to repeated applications following by drying and heat treatment. The methods above described lend themselves to applications of exceedingly thin films on surfaces such as window glass. In the case of window glass, to prevent glare, the film should be very thin, for example less than .001 of an inch in thickness. The presence of this thin silica film tends to destroy surface reflection, an effect which may be due to polarization of the light beam or to a lowering of the reflective power of the surface. Glass ordinarily reflects about ten percent of the incident light, and the silica reduces this reflection to a negligible value.

In the case of dishes the film may have the thickness of ordinary dish glaze, since extreme thinness is not necessary. In this use the low coefficient for heat expansion is the important characteristic of the silica desired, the silica film tending to prevent fissures and cracks due to heat changes.

The methods above described are also readily applicable to the coating of glass to prevent glare in headlamps and windshields, cooking utensils, instrument casing glass, and for many other uses.

The silica or quartz as finally deposited and heat treated on the surface to be coated has the properties of natural silica, being a vitreous, hard, dense, homogeneous and either translucent or transparent, depending on the furnace treatment.

This application is a continuation-in-part of my application Serial No. 734,227, filed July 7, 1934, and issued as Patent No. 2,268,589.

While I have indicated certain methods of manufacture for silica films which may be preferred, changes may be made in the details of the process steps without substantially departing from the invention defined in the claims. For example, instead of using only one method of layer deposit I may use two or all three methods successively on the same article.

I claim as my invention:

1. A process of reducing glare from the transparent surface of a glass article by depositing thereon a thin film of silica which comprises forming a liquid suspension of silica particles obtained by deposition on a plate of the burned product of combustion of a vapor derived from a combustible, vaporizable silicon compound selected from the group consisting of silicochloroform, silicomethane, silicoethylene and silicon hydrides, dipping the article surface into said suspension, drying the adherent silica film and repeating the dipping and drying until a film is formed less than 0.001 inch in thickness and heating the coated article to a temperature within the range of 1000° C. and 1500° C. but below the fusion temperature of the glass surface whereby the silica film becomes bonded to the glass surface and imparts thereto a reflective power less than that of the glass surface alone.

2. A process of reducing glare from the transparent surface of a glass article by depositing thereon a thin film of silica, which comprises forming a liquid suspension of silica particles obtained by deposition on a plate of the burned product of combustion of the vapor of silicochloroform, dipping the article surface into said suspension, drying the adherent silica film, and repeating the dipping and drying until a film is formed less than 0.001 inch in thickness and heating the coated article to a temperature within the range of 1000° C. and 1500° C. but below the fusion temperature of the glass surface whereby the silica film becomes bonded to the glass surface and imparts thereto a reflective power less than that of the glass surface alone.

JOHN ALLEN HEANY.

REFERENCES CITED

The following references are of record in the file of this patent:

UNITED STATES PATENTS

| Number | Name | Date |
|---|---|---|
| 1,278,521 | Tillyer | Sept. 10, 1918 |
| 1,843,792 | Thomson | Feb. 2, 1932 |
| 1,964,322 | Hyde | June 26, 1934 |
| 2,027,931 | Ray | Jan. 14, 1936 |
| 2,207,656 | Cartwright et al. | July 9, 1940 |
| 2,220,862 | Blodgett | Nov. 5, 1940 |
| 2,268,589 | Heany | Jan. 6, 1942 |
| 2,272,342 | Hyde | Feb. 10, 1942 |
| 2,295,626 | Beese | Sept. 15, 1942 |
| 2,366,516 | Geffcken | Jan. 2, 1945 |

FOREIGN PATENTS

| Number | Country | Date |
|---|---|---|
| 502,978 | Great Britain | Mar. 29, 1939 |

OTHER REFERENCES

Jones et al., J. O. S. A., Jan. 1941, pages 34–37, inclusive.